(12) United States Patent
Vogel et al.

(10) Patent No.: US 7,012,634 B2
(45) Date of Patent: *Mar. 14, 2006

(54) SYSTEM AND METHOD FOR CALIBRATING AN IMAGE CAPTURE DEVICE

(75) Inventors: Richard M. Vogel, Pittsford, NY (US); Erin S. Wanek, Webster, NY (US); James M. Enge, Spencerport, NY (US); Bruce H. Pillman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 672 days.

This patent is subject to a terminal disclaimer.

(21) Appl. No.: 10/109,221

(22) Filed: Mar. 28, 2002

(65) Prior Publication Data
US 2003/0184655 A1   Oct. 2, 2003

(51) Int. Cl.
H04N 17/00 (2006.01)
H04N 17/02 (2006.01)

(52) U.S. Cl. .............. 348/187; 348/180; 358/509; 382/312

(58) Field of Classification Search .......... 348/180, 348/187, 207.99; 358/504–505, 509, 513, 358/406, 461, 482, 483, 516, 529; 382/312
See application file for complete search history.

(56) References Cited

U.S. PATENT DOCUMENTS

| | | | |
|---|---|---|---|
| 4,315,677 A | 2/1982 | Johnson et al. | |
| 4,903,055 A | 2/1990 | Lourette et al. | |
| 5,668,596 A | 9/1997 | Vogel | |
| 5,918,192 A | 6/1999 | Tomaszewski | |
| 5,982,957 A * | 11/1999 | DeCaro et al. | 382/312 |
| 6,127,783 A | 10/2000 | Pashley et al. | |
| 6,191,872 B1 * | 2/2001 | DeCaro et al. | 358/509 |
| 6,205,244 B1 * | 3/2001 | Bawolek et al. | 382/162 |
| 6,269,184 B1 * | 7/2001 | Spaulding et al. | 382/167 |
| 6,310,626 B1 * | 10/2001 | Walker et al. | 345/589 |
| 6,542,185 B1 * | 4/2003 | Bogardus | 348/223.1 |
| 6,759,814 B1 * | 7/2004 | Vogel et al. | 315/312 |
| 6,862,119 B1 * | 3/2005 | Yamamoto | 358/487 |
| 2001/0048536 A1 * | 12/2001 | Lehmann et al. | 358/513 |
| 2002/0005946 A1 * | 1/2002 | Oomori et al. | 356/237.2 |

FOREIGN PATENT DOCUMENTS

| | | |
|---|---|---|
| EP | 0 456 343 A1 | 3/1991 |
| EP | 1134973 A2 | 9/2001 |

OTHER PUBLICATIONS

"Measuring Colour," by R.W.G. Hunt, 1987, Section 2.4 and 3.3.
A Guide to Integrating Sphere Radiometry and Photometry, published by Labsphere, Inc., PO box 70, North Sutton, NH 03260.
Web site: www.gamma-sci.com, Photometric Calibration, Radiometric Calibration, CCD, CMOS, . . . .
Web site: www.testandmeasurement.com.

* cited by examiner

Primary Examiner—Ngoc-Yen Vu
Assistant Examiner—Carramah J. Quiett
(74) Attorney, Agent, or Firm—Clyde E. Bailey, Sr.

(57) ABSTRACT

A system and method for use in testing and calibrating both electronic and traditional photographic devices. An illuminator with solid-state emitters and having independent control of both output spectral characteristics and power level enable the system and method to accurately test and calibrate the desired equipment.

8 Claims, 3 Drawing Sheets

SYSTEM AND METHOD FOR CALIBRATING AN IMAGE CAPTURE DEVICE

CROSS-REFERENCE TO RELATED APPLICATIONS

The present application is related to U.S. application Ser. No. 10/108,975, filed Mar. 28, 2002, by Richard M. Vogel, et al., and entitled, "ILLUMINATOR AND METHOD OF MAKING SAME," which is herein incorporated by reference.

FIELD OF THE INVENTION

This invention relates generally to the field of test and measurement systems. More particularly, the invention concerns a system and method suitable for use in testing and calibrating electronic imaging and traditional photographic equipment.

BACKGROUND OF THE INVENTION

Test and measurement systems for use in testing and calibration of electronic imaging and traditional photographic equipment often include some form of illumination system having a set of characteristics suitable for the type of tests and calibrations to be performed. Other accessories such as electromagnetic shutters, color-conversion filters, neutral-density filters and the like are typically included in such test fixtures to tailor the response of the illumination source to suit the requirements of a particular test.

Recent developments have made possible the replacement of the traditional types of light sources, along with their requisite accessories, with a solid-state light source having independently programmable output spectra and power level. U.S. application Ser. No. 10/108,975, by Richard M. Vogel, et al., entitled "ILLUMINATOR AND METHOD OF MAKING SAME" (incorporated herein by reference), describes such a solid-state illuminator. All of the features, benefits, advantages and claims of this co-pending application are incorporated herein by reference.

Therefore, a need persists for a system and method for calibrating an imaging device that exhibits independent control over both the output spectral characteristics and power level.

SUMMARY OF THE INVENTION

Therefore, it is an object of the invention to provide a system and method for calibrating an image capture device that exhibits independent control over both spectral characteristics and power level.

The present invention is directed to overcoming one or more of the problems set forth above. Briefly summarized, according to one aspect of the present invention, a method of calibrating an image capture device includes the step of providing an image capture device and an illuminator. The illuminator has an integrating chamber with energy inlet ports and energy outlet ports and a plurality of emitter means arranged for directing energy along a predetermined optical path through the energy inlet ports into the integrating chamber and through the energy outlet ports of the integrating chamber. The image capture device is positioned proximate to the energy output ports of the integrating chamber. Means is provided for transferring emitted energy from the integrating chamber of the illuminator to the image capture device. Also, a master control means is used for controllably coordinating the illuminator and image capture device during calibration. Prior to the calibration operation, the controller is directed to set the image capture device into an imagewise exposing state for the purpose of forming an image. Also, the illuminator is instructed to sequentially present to the image capture device a plurality of stimulus. The stimulus have both a programmable spectral and exposure characteristics according to a test-specific predetermined algorithm. The controller is then directed to store the image resulting from previous steps. Once the images are formed, the controller is directed to operate on the formed images according to the test-specific predetermined algorithm so as to generate a data set characteristic of the test-specific predetermined algorithm. The data set from the test specific predetermined algorithm is then compared with a predetermined set of product specification limits characteristic of the image capture device. Finally, the calibration parameters are stored in a media associated with the image capture device for subsequent processing of newly formed images.

In another aspect of the invention, a system for calibrating an image capture device includes an illuminator having an integrating chamber with energy inlet ports and energy outlet ports. A plurality of emitter means are arranged in the illuminator for directing energy along a predetermined optical path through the energy inlet ports onto the integrating chamber and through the energy outlet ports of the integrating chamber. Means are provided for transferring emitted energy from the integrating chamber of the illuminator to the image capture device. A master control means provides coordination between the illuminator and image capture device during calibration. The master controller sets the image capture device into an imagewise exposing state for the purpose of forming an image. Finally, means are provided for operably interfacing the image capture device to the master control means.

Therefore, advantages of the present invention include an ability to test and calibrate both electronic and traditional imaging systems. Another advantage is that the system and method of the invention can test and calibrate while maintaining independent control over the spectral characteristics and power level of the illuminator assembly. Yet another advantage is that the system and method are easy to use and produce far greater accurate calibrations compared to existing systems.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
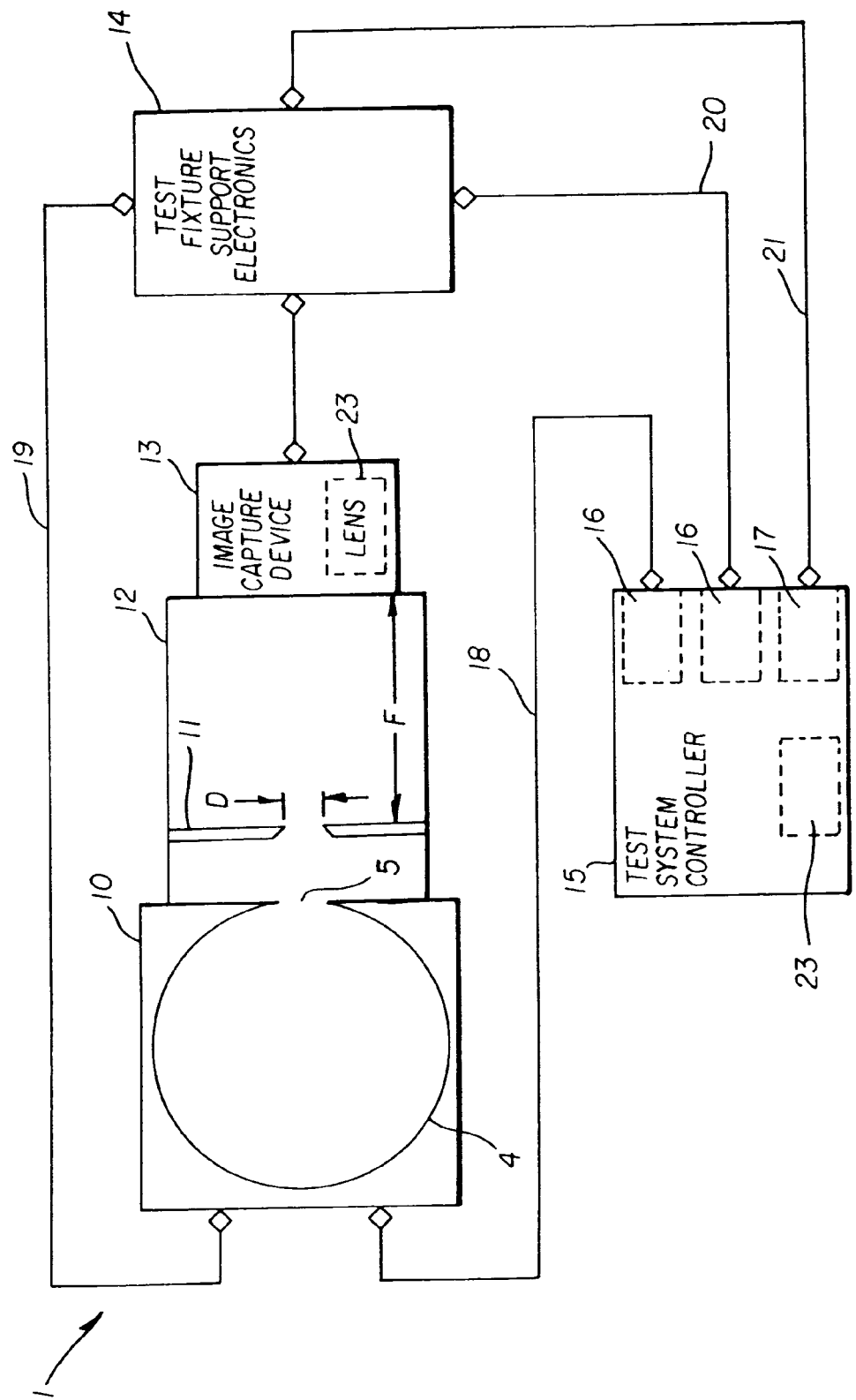
FIG. 1 is a block diagram of a first preferred embodiment of a test and calibration system for testing and calibration of an image capture device having an aperture.
Figure 2:
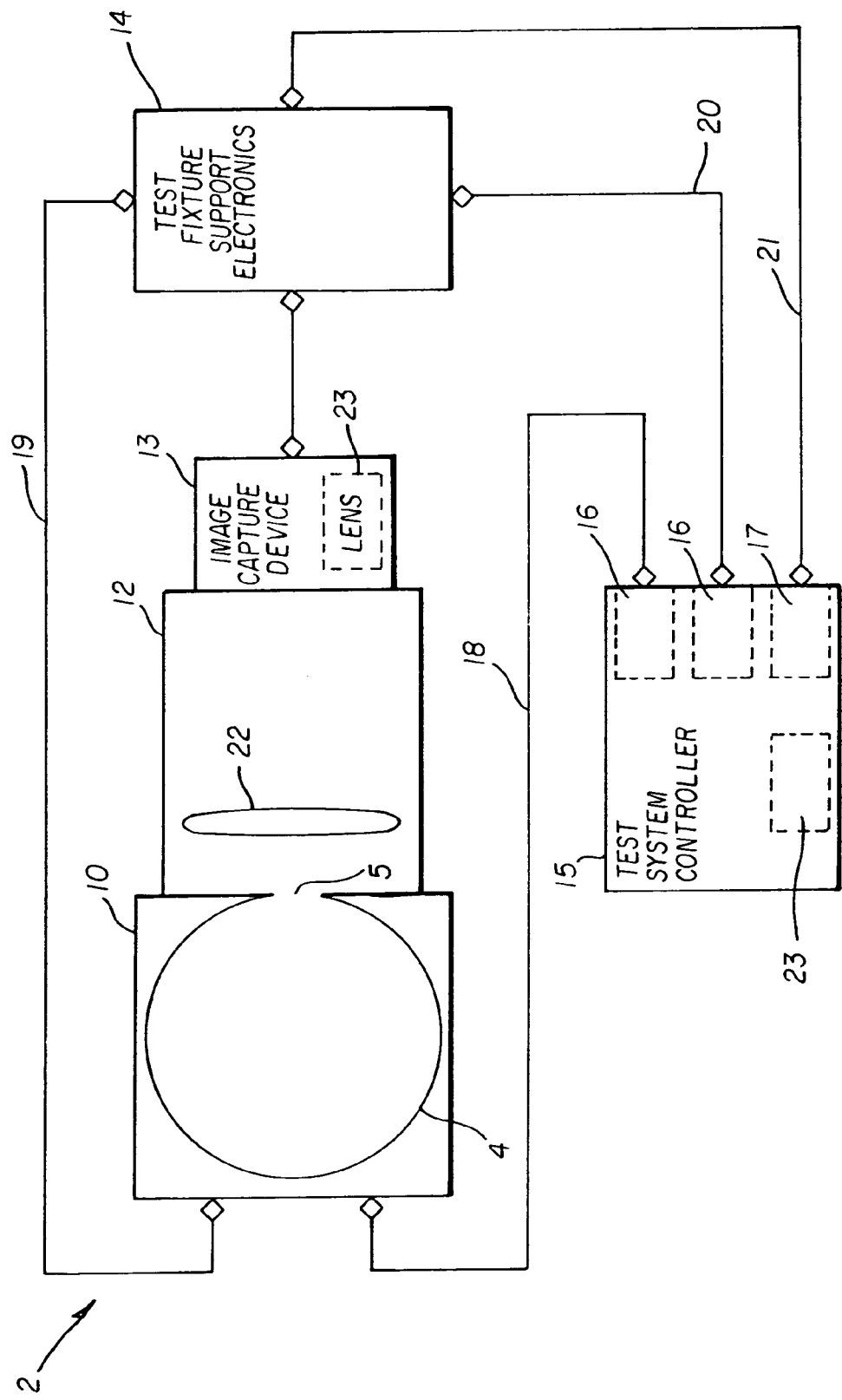
FIG. 2 is block diagram of a second preferred embodiment of a test and calibration system for testing and calibration of an image capture device having a condenser lens; and, FIG. 3 is a block diagram of the calibration process.

Turning now to the drawings, and in particular to FIGS. 1 and 2, the system 1 of the invention is illustrated. According to FIG. 1, a preferred embodiment of the system 1 for testing and calibrating an image capture device 13 has an illuminator 10 positioned proximate to image capture device 13. Illuminator 10 has a plurality of LED emitters (not shown) arranged in the inlet port 5 of an integrating chamber 4. The LED emitters emit radiant energy into the chamber and out an exit port of the chamber in the manner described in details in U.S. patent application Ser. No. (D82167). Means, preferably an aperture 11, transfers radiant output energy from the LED emitter through the illuminator 10 and a light-tight chamber 12. The radiant output energy is then allowed to pass from the light-tight chamber 12 onto the image capture device 13. Each of the illuminator 10, light tight chamber 12, and image capture device 13 is conveniently supported for operations by test fixture support electronics 14.

Referring again to FIG. 1, a test system controller 15 provides a suitable interface means 16 for controlling the LED illuminator 10 and test fixture support electronics 14. According to FIG. 1, frame grabber 17 for inputting images from the image capture device 13 to the test system controller 15 is also provided. Moreover, an aperture 11 is located proximate to the exit port of the LED illuminator 10. Preferably, aperture 11 has a diameter 'D' and is located a distance 'F' from the image capture device 13. The aforementioned system parameters may be adjusted to provide the desired f-number of the illuminating cone on the image capture device 13 to be tested according to the formula:

$$f\text{-number}=F/D,$$

wherein f is the f-stop;
wherein F is the distance from the aperture to the image capture device; and,
wherein D is the diameter of the aperture.

Referring to FIG. 1, LED Illuminator 10 receives control information from the test system controller 15 via a bi-directional control interface 18 supported by an interface means 16 which is part of the test system controller 15. The interface means 16 may be a parallel or serial interface port that is built-in to the test system controller 15 or may be an accessory which is mounted internally or externally to the test system controller 15. The command set for the LED Illuminator 10 comprises selection of the operating mode (continuous, repetitive, single-shot, gated) and specification of the output level and spectral shape. The LED Illuminator 10 further receives synchronization signals from the test fixture support electronics 14 via a bi-directional synchronization interface 19. The synchronization signals includes signals both for triggering the LED Illuminator 10 in single-shot or gated modes and inhibiting periodic calibration during repetitive or continuous modes. Moreover, the synchronization signals includes signals for initiating calibration during singleshot or gated modes and a BUSY signal to instruct the test fixture support electronics 14 that the LED Illuminator 10 is currently processing a synchronization request.

Still referring to FIG. 1, light-tight chamber 12 ensures that no stray light enters the optical path between the LED Illuminator 10, aperture 11 and image capture device 13 while a test or calibration is in progress.

As depicted in FIG. 1, test fixture support electronics 14 provides for any miscellaneous support functions as may be necessary and comprises the functions of operating the test fixture mechanism and image capture device 13 and coordinating such operation with the test system controller 15 and LED Illuminator 10. The test fixture support electronics 14 receives control information from the test system controller 15 via a bi-directional control interface 20 supported by an interface means 16 which is part of the test system controller 15. The interface means 16 may be a parallel or serial interface port that is built-in to the test system controller 15 or may be an accessory which is mounted internally or externally to the test system controller 15. According to FIG. 1, test system controller 15 includes a frame grabber 17 that receives images from the image capture device 13 by way of test fixture support electronics 14. A video interface 21 coordinates the communications between test fixture support electronics 14 and frame grabber 17.

Turning now to FIG. 2, a second embodiment of a test and calibration system 2 for testing and calibration of an image capture device is illustrated. According to FIG. 2, system 2 has practically all of the elements previously described except for the aperture 11 (shown in FIG. 1). In this embodiment, aperture 11 is replaced with a condenser lens 22 as the means of conveying the radiant output energy from the LED illuminator 10 to the image capture device 13 to be tested.

Figure 3:
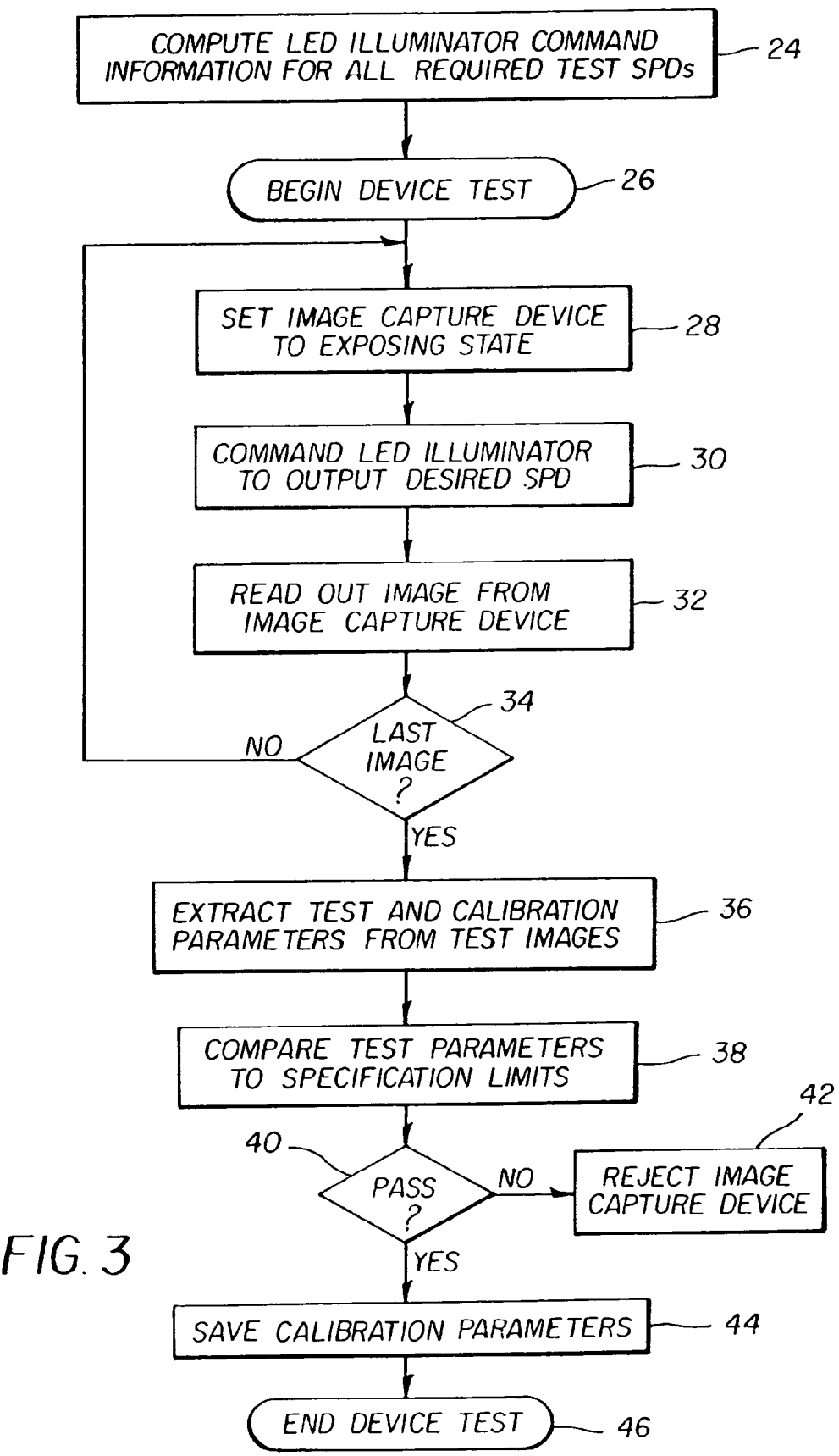

Referring now to FIGS. 1 and 3, prior to the start of testing, software within the test system controller 15 determines the control parameters necessary for the LED illuminator 10 to produce each of the plurality of spectral power distributions (SPDs) required by the predetermined test algorithm 24. These commands may then be sent to the LED illuminator as each SPD is required or queued in the LED illuminator 10 and executed sequentially as each SPD is required. Once the test begins 26, the test algorithm directs the test system controller 15 to set the image capture device 13 into an imagewise exposing state for the purpose of forming an image 28. Next, the test system controller 15 instructs the LED illuminator 10 to present a stimulus having the desired spectral and exposure characteristics according to a test-specific algorithm 30. Following completion of the exposure, the test algorithm instructs the test system controller 15 to read out 32 the resulting image from the image capture device 13 and store it for later analysis. This process is repeated until all of the SPDs have been presented to the image capture device 13 and the resulting images read out and stored for analysis. Following read out of the last image 34, the test algorithm instructs the test system controller 15 to extract test and calibration parameters 36 from the plurality of stored images. These test parameters are then compared 38 to a set of predetermined specification limits to determine whether the image capture device is performing acceptably or not 40. If the image capture device does not perform within specified limits it is rejected 42. However, the calibration parameters are saved in a storage media (refer to feature 23 in FIGS. 1 and 2) for later use 44. The storage media 23 may, for example, be a non-volatile portion of the image capture device 13 itself or a non-volatile memory device located on the circuit module containing the image capture device 13 or elsewhere within the product containing the image capture device 13. The storage media 23 may also be located external to the image capture device 13 in, for example, the test system controller 15.

The invention has been described with reference to a preferred embodiment. However, it will be appreciated that variations and modifications can be effected by a person of ordinary skill in the art without departing from the scope of the invention.

PARTS LIST 1 system
2 second system
3 exit port
4 integrating chamber
5 inlet port
10 LED illuminator
11 aperture
12 light-tight chamber
13 image capture device
14 test fixture support electronics
15 test system controller
16 controller interface means
17 frame grabber
18 LED illuminator bi-directional control interface
19 LED illuminator bi-directional synchronization interface
20 test fixture bi-directional control interface
21 video interface
22 condenser lens
23 storage medium for calibration parameters
24 step—predetermined test algorithm
26 step—begin device test
28 step—set image capture device to exposing state
30 step—command LED illuminator to output desired SPD
32 step—read out image from image capture device
34 decision—last image or not
36 step—extract test and calibration parameters from test images
38 step—compare test parameters to specification limits
40 decision—image capture device performing acceptably or not

What is claimed is:

1. Method of calibrating an image capture device, comprising the steps of:
    (a) providing an image capture device;
    (b) providing an illuminator having an integrating chamber with energy inlet ports for receiving energy and energy outlet ports having openings arranged for transmitting energy received through said energy inlet ports, said energy inlet port comprising N+2 number of said energy inlet ports arranged symmetrically about said energy outlet port, where N is an odd integer, and wherein each one of said energy inlet ports has an optical axis generally normal to an optical axis of said energy outlet port and a plurality of emitter means arranged for directing energy along a predetermined optical path through said energy inlet ports into said integrating chamber and through said energy outlet ports of said integrating chamber, said plurality of emitter means comprising a plurality of light emitting diodes (LED) and a circuit board operably connected to each one of said plurality of light emitting diodes (LED);
    (c) positioning said image capture device proximate to said energy output ports of said integrating chamber;
    (d) arranging means for transferring emitted energy from said integrating chamber of said illuminator to said image capture device;
    (e) providing a master control means for controllably coordinating said illuminator and said image capture device during calibration;
    (f) directing said master control means to set said image capture device into an imagewise exposing state for the purpose of forming an image;
    (g) instructing said illuminator to sequentially present to said image capture device a plurality of stimulus having programmable spectral and exposure characteristics according to a test-specific predetermined algorithm;
    (h) directing said master control means to store said image resulting from steps f and g;
    (i) directing said master control means to operate on said images according to the test-specific predetermined algorithm so as to generate a data set characteristic of said test-specific predetermined algorithm;
    (j) comparing said data set from said test-specific predetermined algorithm, comprising calibration parameters, with a predetermined set of product specification limits characteristic of said image capture device; and,
    (k) storing said calibration parameters in a media associated with said image capture device for subsequent processing of newly formed images.

2. The method recited in claim 1 wherein said step of providing arranging means for transferring emitted energy includes the step of arranging an aperture in said energy outlet ports of said illuminator.

3. The method recited in claim 1 wherein said step of providing arranging means for transferring emitted energy includes the step of arranging a condenser lens in said energy outlet ports of said illuminator.

4. System for calibrating an image capture device, comprising:
    an illuminator having an integrating chamber with energy inlet ports for receiving energy and energy outlet ports having openings arranged for transmitting energy received through said energy inlet ports, said energy inlet port comprising N+2 number of said energy inlet ports arranged symmetrically about said energy outlet port, where N is an odd integer, and wherein each one of said energy inlet ports has an optical axis generally normal to an optical axis of said energy outlet port and a plurality of emitter means arranged for directing energy along a predetermined optical path through said energy inlet ports into said integrating chamber and through said energy outlet ports of said integrating chamber, said plurality of emitter means comprising a plurality of light emitting diodes (LED) and a circuit board operably connected to each one of said plurality of light emitting diodes (LED);
    means for transferring emitted energy from said integrating chamber of said illuminator to said image capture device;
    a master control means for controllably coordinating said illuminator and said image capture device during calibration, said master control means being able to set said image capture device into an imagewise exposing state for the purpose of forming an image; and,
    means for operably interfacing said image capture device to said master control means.

5. The system recited in claim 4 wherein said means for transferring emitted energy is an aperture.

6. The system recited in claim 4 wherein said means for transferring emitted energy is a condenser lens.

7. The system recited in claim 4 wherein said means for transferring emitted energy comprises one of a plurality of apertures.

8. The system recited in claim 4 wherein an algorithm associated with said master control means that defines a suite of tests required to functionally test and calibrate said image capture device.

* * * * *